US006470676B2

United States Patent
Dölling et al.

(10) Patent No.: US 6,470,676 B2
(45) Date of Patent: Oct. 29, 2002

(54) METHOD FOR THE CATALYTIC CONVERSION OF NITROGEN OXIDES CONTAINED IN THE EXHAUST GAS OF AN INTERNAL COMBUSTION ENGINE

(75) Inventors: Winfried Dölling, Weissenbrunn; Lothar Hofmann, Altenkunstadt, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/909,388

(22) Filed: Jul. 19, 2001

(65) Prior Publication Data

US 2002/0069642 A1 Jun. 13, 2002

Related U.S. Application Data

(63) Continuation of application No. PCT/DE00/00057, filed on Jan. 10, 2000.

(30) Foreign Application Priority Data

Jan. 19, 1999 (DE) ............................... 199 01 915

(51) Int. Cl.$^7$ ................................ F01N 3/00
(52) U.S. Cl. ..................... 60/286; 60/274; 60/295; 60/303
(58) Field of Search .................. 60/274, 285, 286, 60/295, 297, 303

(56) References Cited

U.S. PATENT DOCUMENTS 5,369,956 A * 12/1994 Daudel et al. ............... 60/276
5,540,047 A * 7/1996 Dahlheim et al. ........... 60/274
5,628,186 A * 5/1997 Schmelz ....................... 60/274
5,845,487 A * 12/1998 Fraenkle et al. ............. 60/274
5,849,593 A * 12/1998 Schmelz ....................... 436/55
6,125,629 A * 10/2000 Patchett ........................ 60/286

FOREIGN PATENT DOCUMENTS

| DE | 3337793 A1 | 5/1985 |
| DE | 3721572 A1 | 2/1988 |
| DE | 42 17 552 C1 | 8/1993 |
| EP | 0 515 857 A1 | 12/1992 |
| EP | 0 555 746 A1 | 8/1993 |
| EP | 0 362 483 A1 | 2/1996 |
| WO | PCT/DE95/00646 | 2/1996 |

* cited by examiner

Primary Examiner—Thomas Denion
Assistant Examiner—Binh Tran
(74) Attorney, Agent, or Firm—Laurence A. Greenberg; Werner H. Stemer; Ralph E. Locher

(57) ABSTRACT

A method is provided for the catalytic conversion of nitrogen oxides contained in the exhaust gas of an internal combustion engine. A reducing agent is added in a controlled manner upstream of a denitrification catalyst, as seen in exhaust gas flow direction, and in dependence on a nitrogen oxide concentration. The reducing agent is added in a superstoichiometric amount in relation to the nitrogen oxide content if an operating parameter and/or a value derived from the operating parameter falls below or exceeds a threshold value. The addition of the reducing agent is then terminated or continued in a substoichiometric manner. The invention provides a measure for obtaining an extremely high average nitrogen oxide conversion, especially under varying operating conditions of the internal combustion engine.

22 Claims, 1 Drawing Sheet

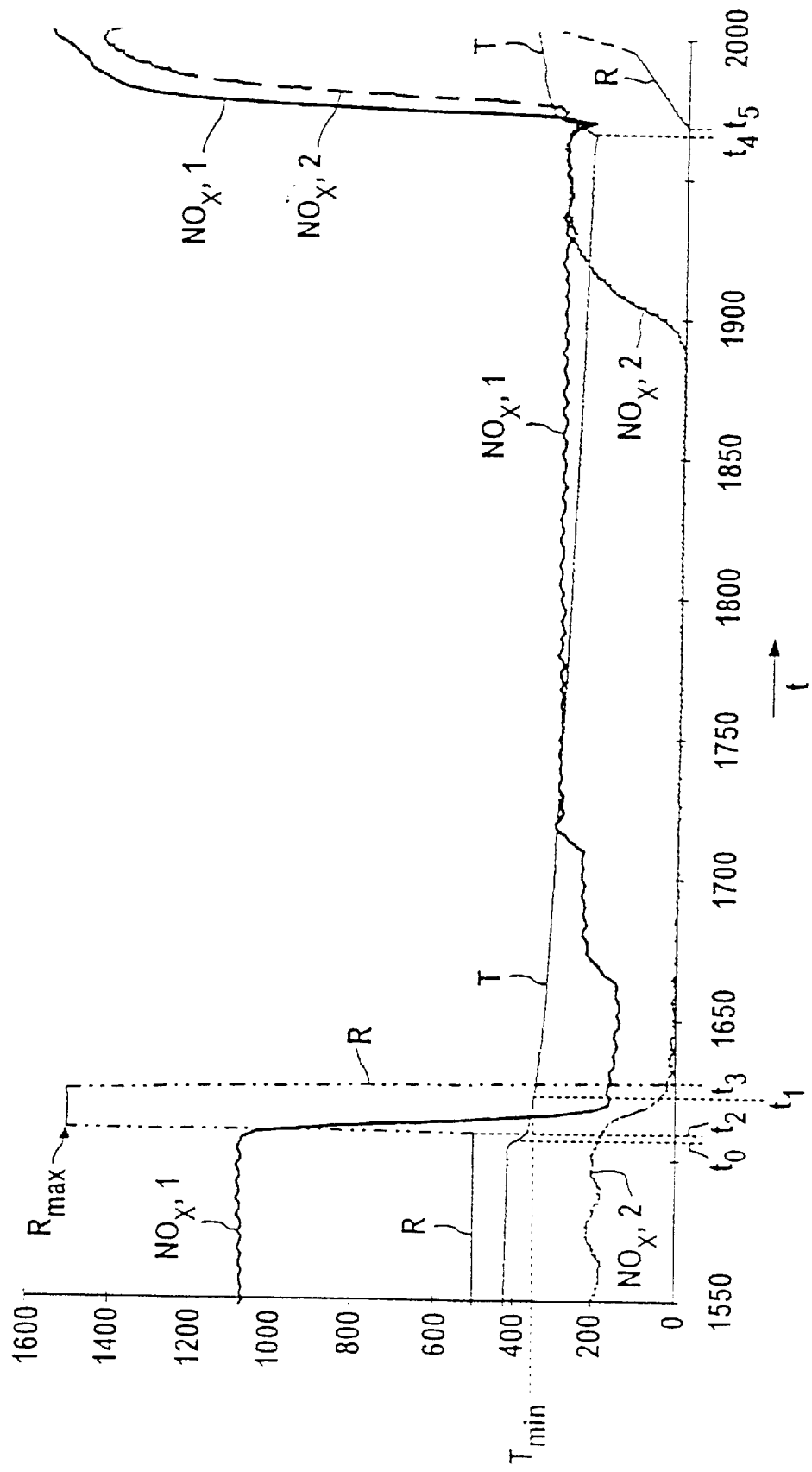

METHOD FOR THE CATALYTIC CONVERSION OF NITROGEN OXIDES CONTAINED IN THE EXHAUST GAS OF AN INTERNAL COMBUSTION ENGINE

CROSS-REFERENCE TO RELATED APPLICATION

This application is a continuation of copending International Application No. PCT/DE00/00057, filed Jan. 10, 2000, which designated the United States.

BACKGROUND OF THE INVENTION

Field of the Invention

The invention relates to a method for the catalytic conversion of nitrogen oxides contained in the exhaust gas of an internal combustion engine. A reducing agent is added to the exhaust gas upstream of a denitrification catalytic converter, as seen in exhaust gas flow direction, and is metered as a function of a nitrogen oxide concentration.

During the selective catalytic reduction (SCR) of nitrogen oxides, a reducing agent, which is generally ammonia or a substance that releases ammonia, for example an aqueous urea solution, has to be added to an exhaust gas which contains the nitrogen oxides. The reducing agent is converted, together with the nitrogen oxides, at an SCR catalytic converter, which is generally based on titanium oxide with additions of metal oxides such as, for example, vanadium, molybdenum and/or tungsten oxide, to form environmentally harmless nitrogen, oxygen, and water.

When the exhaust gas generator (engine, furnace) is operated under non-steady-state conditions, as is the case in particular with vehicle engines, the nitrogen oxide concentrations, the exhaust gas mass flow rate and the exhaust gas temperature vary within wide ranges. This fact places considerable demands on the metering strategy and metering accuracy for the reducing agent which is introduced into the exhaust gas.

In most currently known methods for metering the reducing agent, the reducing agent is introduced into the exhaust gas proportionally to the mass flow of nitrogen oxides. In that case, the flow of reducing agent which is supplied to the exhaust gas has to be selected in significantly substoichiometric proportions in relation to the nitrogen oxide concentration, in order to reliably prevent a breakthrough of the reducing agent, in particular an ammonia breakthrough. However, that has the drawback of not completely utilizing the catalytic activity of the catalytic converter, and consequently higher conversion rates, which can in principle be achieved with the catalytic converter, cannot be achieved due to that metering strategy.

It is known from German Published, Non-Prosecuted Patent Application DE 37 21 572 A1 to use the power and rotational speed of the engine for metering of the reducing agent.

Moreover, it is known from European Patent Application 0 555 746 A1 for the metering of reducing agent to be interrupted completely in the event of the exhaust gas temperature falling below a predetermined limit value and for the metering to be recommenced as a function of the load and rotational speed of the internal combustion engine, only once the temperature limit value has been reached again.

Furthermore, European Patent Application 0 515 857 A1 has disclosed a method in which the reducing agent is metered in a pulsed manner in superstoichiometric proportions and the catalytic converter is run "empty" in intervals between two pulses. In that method, the cyclical addition of superstoichiometric proportions of reducing agent is only interrupted again when a high $NH_3$ concentration, which has been set as a threshold, in the gas phase has been reached at a certain point in a catalyst bed.

European Patent Application 0 362 483 A1 has disclosed a pulse-width-modulated discontinuous metering method, in which the pulse width is set as a function of the exhaust gas mass flow rate and the nitrogen oxide concentration.

The latter four methods are also afflicted with the drawback described above.

Furthermore, International Publication No. WO 96/04980, corresponding to U.S. Pat. No. 5,785,937, has disclosed a method in which the reducing agent is only metered in superstoichiometric proportions, with respect to the nitrogen oxide concentration, during the starting phase of the internal combustion engine and during operation with a falling and if appropriate also a virtually constant exhaust-gas temperature, while taking the temperature-dependent storage capacity of the catalytic converter into account. Otherwise, the reducing agent is metered in substoichiometric proportions.

That method too does not allow the full extent of the higher conversion rate which can be achieved in principle with the catalytic converter, to be reached.

SUMMARY OF THE INVENTION

It is accordingly an object of the invention to provide a method for the catalytic conversion of nitrogen oxides contained in the exhaust gas of an internal combustion engine, which overcomes the hereinafore-mentioned disadvantages of the heretofore-known methods of this general type and which allows the catalytic activity of the catalytic converter to be utilized more successfully.

With the foregoing and other objects in view there is provided, in accordance with the invention, a method for the catalytic conversion of nitrogen oxides contained in the exhaust gas of an internal combustion engine, by adding a reducing agent to the exhaust gas upstream of a denitrification catalytic converter, as seen in exhaust gas flow direction, and metering the reducing agent as a function of a nitrogen oxide concentration. The method comprises measuring an operating parameter of the internal combustion engine influencing the metering; assigning a limit value to the operating parameter; and establishing an operating state of the internal combustion engine being unfavorable for metering, upon falling below or exceeding the limit value. A metered quantity of reducing agent is increased in a preset manner before and/or during falling below or exceeding the limit value. The increase in the metered quantity is terminated during the unfavorable operating state.

The method makes use of the ability of the catalytic converter to store reducing agent. If an SCR control unit which operates in accordance with the method detects the beginning of an operating state of the internal combustion engine which is unfavorable for the metering of reducing agent, the metered quantity is, for example, increased briefly. In this way reducing agent is stored in the catalytic converter. This reducing agent is then available for the nitrogen oxide reduction process during the operating state which is unfavorable for metering (interim storage).

The result is a higher mean nitrogen oxide conversion, in particular during fluctuating operating conditions of the internal combustion engine.

In accordance with another, extremely advantageous, mode of the invention, the variable derived from the operating parameter is derived by differentiating the operating parameter according to time or by forming the difference between measured values of the operating parameter taken at different times. A method which operates in this way is able to detect an operating state which is unfavorable for the metering of reducing agent and to do so particularly quickly and at a particularly early stage.

In accordance with a further mode of the invention, a constant quantity of reducing agent may be metered in the event of falling below or exceeding the particular limit value.

In accordance with an added mode of the invention, the quantity of reducing agent which is metered in superstoichiometric proportions is set as a function of the variable derived from the operating parameter by differentiation or the variable derived from the operating parameter by forming a difference. For example, a corresponding metering interval width may be dimensioned accordingly.

In accordance with an additional mode of the invention, the quantity of reducing agent metered in superstoichiometric proportions is set as a function of the extent to which the limit value of the operating parameter or the limit value of the variable derived from this parameter is exceeded or fallen below.

In accordance with yet another mode of the invention, the quantity of reducing agent metered in superstoichiometric proportions is set as a function of the storage capacity, which is in particular temperature-dependent, of the denitrification catalytic converter.

In accordance with yet a further mode of the invention, the value of the quantity of reducing agent metered in superstoichiometric proportions is stored. For example, an electronic storage medium may be used for this purpose.

The stored value is then taken into account during the further control of the metering of reducing agent. This is important in particular if, shortly after the superstoichiometric metering, contrary to expectation, there is not in fact a prolonged phase with unfavorable metering conditions, but rather good metering conditions are immediately restored. In this situation, then, the preferred procedure which has been described above makes it possible to prevent overfilling of the catalytic converter which stores reducing agent and slippage of reducing agent.

In accordance with a concomitant mode of the invention, the operating parameter is an exhaust gas temperature, an exhaust gas mass flow rate, a load of the internal combustion engine or a rotational speed of the internal combustion engine.

If the operating parameter is the exhaust gas temperature, it is particularly advantageous, in the event of falling below (or exceeding) a limit value of a variable derived from the exhaust-gas temperature by the formation of a differential quotient, for the superstoichiometric metering to be triggered. This is because temperature sensors are often very slow and would only reliably confirm falling below a limit value for the exhaust-gas temperature after a time delay. By contrast, when differentiating the temperature profile this event is almost "anticipated", and an unfavorable operating state is detected very early.

Other features which are considered as characteristic for the invention are set forth in the appended claims.

Although the invention is illustrated and described herein as embodied in a method for the catalytic conversion of nitrogen oxides contained in the exhaust gas of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a graph with which an exemplary embodiment of the method according to the invention will be explained in greater detail.

DESCRIPTION OF THE PREFERRED EMBODIMENTS

Referring now in detail to the single figure of the drawing, there are seen various curves which are plotted over time t (in seconds). Reference symbol T denotes a profile of an exhaust-gas temperature measured upstream of a non-illustrated denitrification catalytic converter. At a first time $t_1$, the exhaust-gas temperature T falls below a limit value $T_{min}$, beneath which metering is no longer reliably possible. For example, at the first time $t_1$ superstoichiometric metering could be initiated, which would then commence after a time delay.

By contrast, in the exemplary embodiment illustrated in the drawing, the fact that a gradient is not reached (i.e. in this case in absolute terms the limit value being exceeded), which is established at an earlier time to by forming a differential quotient of the temperature profile, is used to initiate the superstoichiometric metering. In this case, a limit value for the gradient in the exhaust-gas temperature curve T is fixed instead of a limit value $T_{min}$ for the exhaust-gas temperature.

According to the method of the invention, in this case a reducing agent R is metered at a superstoichiometric maximum level $R_{max}$. In the illustrated example, the metering commences with a short time delay, at a later second time $t_2$.

At a third time $t_3$, which is about 10 seconds later, the metering of the reducing agent R is ended. The width of an interval between the second time $t_2$ and the third time $t_3$ (superstoichiometric metering interval) and/or the maximum level $R_{max}$ are set as a function of the catalytic converter temperature, which represents a measure of the storage capacity of the denitrification catalytic converter.

In the diagram, $NO_x$, 1 denotes a nitrogen oxide concentration upstream of the catalytic converter, and $No_x$, 2 denotes the nitrogen oxide concentration downstream of the catalytic converter.

The quantity of reducing agent which is metered during the superstoichiometric metering interval, that is substantially proportional to the area below the curve denoted by reference symbol R between the second time $t_2$ and the third time $t_3$, is stored in the catalytic converter and acts during the period after the third time $t_3$. In this way, nitrogen oxides are broken down even in a time interval between the third time $t_3$ and a subsequent fourth time $t_4$, even though metering was not possible during this time interval due to the exhaust-gas temperature T falling below the limit value $T_{min}$.

At the fourth time $t_4$, the gradient of the exhaust-gas temperature curve T is once again particularly great and the reducing agent metering is recommenced, starting at a staggered fifth time $t_5$.

We claim:

1. In a method for the catalytic conversion of nitrogen oxides contained in the exhaust gas of an internal combustion engine, by adding a reducing agent to the exhaust gas upstream of a denitrification catalytic converter, as seen in exhaust gas flow direction, and metering the reducing agent as a function of a nitrogen oxide concentration, the improvement which comprises:

a) measuring an operating parameter of the internal combustion engine influencing the metering;
assigning a limit value to the operating parameter;
establishing an operating state of the internal combustion engine being unfavorable for metering, upon falling below or exceeding the limit value;

b) increasing a metered quantity of reducing agent in a preset manner at least one of before and during falling below or exceeding the limit value; and c) terminating the increase in the metered quantity during the unfavorable operating state.

2. The method according to claim 1, which further comprises carrying out the step of increasing the metered quantity for a short time.

3. The method according to claim 1, which further comprises carrying out the step of increasing the metered quantity for approximately 10 seconds.

4. The method according to claim 1, which further comprises carrying out the step of increasing the metered quantity in a preset manner to a superstoichiometric metered quantity.

5. The method according to claim 1, which further comprises selecting the limit value as a limit value of a variable derived from the operating parameter.

6. The method according to claim 5, which further comprises deriving the variable derived from the operating parameter by differentiating the operating parameter according to time.

7. The method according to claim 5, which further comprises deriving the variable derived from the operating parameter by forming a difference between measured values of the operating parameter taken at different times.

8. The method according to claim 6, which further comprises setting a quantity of reducing agent metered in superstoichiometric proportions as a function of the variable derived from the operating parameter by differentiation.

9. The method according to claim 7, which further comprises setting a quantity of reducing agent metered in superstoichiometric proportions as a function of the variable derived from the operating parameter by forming a difference.

10. The method according to claim 8, which further comprises setting the quantity of reducing agent metered in superstoichiometric proportions as a function of the extent to which the limit value of the operating parameter is exceeded or fallen below.

11. The method according to claim 9, which further comprises setting the quantity of reducing agent metered in superstoichiometric proportions as a function of the extent to which the limit value of the operating parameter is exceeded or fallen below.

12. The method according to claim 8, which further comprises setting the quantity of reducing agent metered in superstoichiometric proportions as a function of the extent to which the limit value of the variable derived from the operating parameter is exceeded or fallen below.

13. The method according to claim 9, which further comprises setting the quantity of reducing agent metered in superstoichiometric proportions as a function of the extent to which the limit value of the variable derived from the operating parameter is exceeded or fallen below.

14. The method according to claim 8, which further comprises setting the quantity of reducing agent metered in superstoichiometric proportions as a function of a storage capacity of the denitrification catalytic converter.

15. The method according to claim 9, which further comprises setting the quantity of reducing agent metered in superstoichiometric proportions as a function of a storage capacity of the denitrification catalytic converter.

16. The method according to claim 8, which further comprises setting the quantity of reducing agent metered in superstoichiometric proportions as a function of a temperature-dependent storage capacity of the denitrification catalytic converter.

17. The method according to claim 9, which further comprises setting the quantity of reducing agent metered in superstoichiometric proportions as a function of a temperature-dependent storage capacity of the denitrification catalytic converter.

18. The method according to claim 4, which further comprises storing a value assigned to the superstoichiometrically metered quantity of reducing agent.

19. The method according to claim 1, wherein the operating parameter includes an exhaust-gas temperature.

20. The method according to claim 1, wherein the operating parameter includes an exhaust-gas mass flow rate.

21. The method according to claim 1, wherein the operating parameter includes a load of the internal combustion engine.

22. The method according to claim 1, wherein the operating parameter includes a rotational speed of the internal combustion engine.

* * * * *